(12) United States Patent
Itagaki (10) Patent No.: US 7,806,330 B2
(45) Date of Patent: Oct. 5, 2010

(54) RADIO-TAG READING APPARATUS AND RADIO TAG

(75) Inventor: Yuya Itagaki, Izunokuni (JP)

(73) Assignee: Toshiba Tec Kabushiki Kaisha (JP)

( * ) Notice: Subject to any disclaimer, the term of this patent is extended or adjusted under 35 U.S.C. 154(b) by 383 days.

(21) Appl. No.: 12/001,890

(22) Filed: Dec. 13, 2007

(65) Prior Publication Data

US 2008/0173716 A1  Jul. 24, 2008

(30) Foreign Application Priority Data

Jan. 19, 2007  (JP) .............................. 2007-010406

(51) Int. Cl.
*G06F 19/00* (2006.01)

(52) U.S. Cl. .................................... 235/385

(58) Field of Classification Search ................ 235/383, 235/385, 375, 492
See application file for complete search history.

(56) References Cited

U.S. PATENT DOCUMENTS

| 6,313,745 | B1 | 11/2001 | Suzuki |
| 6,817,522 | B2 * | 11/2004 | Brignone et al. ............ 235/385 |
| 6,883,710 | B2 * | 4/2005 | Chung ........................ 235/385 |
| 7,150,395 | B1 * | 12/2006 | White ......................... 235/383 |
| 7,325,734 | B2 * | 2/2008 | Howarth et al. ............. 235/451 |
| 7,471,201 | B2 * | 12/2008 | Ono ........................ 340/572.1 |

FOREIGN PATENT DOCUMENTS

| GB | 2358110 | 7/2001 |
| JP | 07-104901 | 4/1995 |
| JP | 08-180104 | 7/1996 |
| JP | 11-096463 | 4/1999 |
| JP | 2001-249987 | 9/2001 |
| JP | 2005-250684 | 9/2005 |
| JP | 2005-310047 | 11/2005 |

OTHER PUBLICATIONS

Communication from European Patent Office, dated Jun. 2, 2008, re: related application.

* cited by examiner

*Primary Examiner*—Seung H Lee
(74) *Attorney, Agent, or Firm*—Harness, Dickey & Pierce, P.L.C.

(57) ABSTRACT

The radio-tag data containing the merchandise management data about an item of merchandise from the radio tag attached to the item of merchandise. It is determined whether a prescribed one of the bytes constituting the radio-tag data is identification data that specifies the merchandise management data. If the prescribed byte is determined to be identification data, a prescribed number of bytes following the prescribed byte are extracted from the radio-tag data. The bytes thus extracted are output as merchandise management data.

5 Claims, 6 Drawing Sheets

RADIO-TAG READING APPARATUS AND RADIO TAG

CROSS-REFERENCE TO RELATED APPLICATIONS

This application is based upon and claims the benefit of priority from prior Japanese Patent Application No. 2007-010406, filed Jan. 19, 2007, the entire contents of which are incorporated herein by reference.

BACKGROUND OF THE INVENTION

1. Field of the Invention

The present invention relates to a radio-tag reading apparatus for reading data from radio tags.

2. Description of the Related Art

A system that uses barcodes, achieving the management of the information about merchandise sold has been established in the physical distribution and retail business. In the system, a barcode is attached to each item of merchandise, each identifying the item of merchandise. To read the barcode, a barcode reader is connected to the point-of-sales (POS) terminal installed in each shop.

The shop clerk uses the barcode reader, reading the barcodes attached to the items of merchandise a customer has bought. The barcode data is input from the barcode reader to the POS terminal. On the basis of the barcode data, the POS terminal processes the sales information about the items of merchandise the customer has bought.

In recent years, radio data carriers called radio tags have come to attract attention in the physical distribution and retail business. The radio tag has an IC chip and an antenna. The IC chip has a memory, which stores ID data, or tag identifier, specific to the radio tag. The radio tag can perform radio communication with a dedicated reader/writer. The reader/writer can therefore read the data stored in the memory and write data to the memory, without contacting the radio tag.

Barcode data cannot be read from barcodes unless the barcode reader scans them one by one. Radio tags communicate with the reader/writer under the control accomplished by a so-called anti-collision method. Thanks to the anti-collision method, the reader/writer can read data from a plurality of radio tags at a time even if the radio tags sparsely exist in the communications region of the reader/writer. Radio tags are therefore advantageous over barcodes in terms of data-processing efficiency.

In the physical distribution and retail business, it is proposed that a system that uses radio tags to achieve the management of the sales information about merchandise should be designed and employed. In the system, a radio tag is attached to each item of merchandise, the radio tag storing the identification code of the item of merchandise. A radio-tag reader/writer is connected to the point-of-sales (POS) terminal installed in each shop.

The shop clerk places the items of merchandise a customer has bought, in the communications region of the radio-tag reader/writer. Then, the radio-tag reader/writer reads all the data items stored in the radio tags attached to the items of merchandise in one go. The data thus read is then input to the POS terminal installed in the shop. On the basis of the data read from the radio tag, the POS terminal processes the sales information about all items of merchandise the customers have bought.

To establish such a system using radio tags, however, the existing POS terminals designed for processing the barcode data must be redesigned in terms of function. Inevitably, the cost of redesigning the POS terminals is so high that the system can hardly be used widely.

Jpn. Pat. Appln. No. 11-96463 discloses a technique of employing both a merchandise management system using barcodes and a merchandise management system using radio tags. The technique involves combining a barcode and a radio tag, forming a merchandise tag, and using such merchandise tags to accomplish merchandise management.

Since barcodes attached to items of merchandise have a fixed format, each barcode contains only a limited amount of information. Therefore, a so-called multi-stage barcode system using multi-stage barcodes, each consisting of two or more barcodes, to manage one item of merchandise, is employed in the apparel industry, in which not only the merchandise ID code, but also other information such as size, color, etc., must be managed about each item of merchandise.

POS terminals for use in the multi-stage barcode system are known (see, for example, Jpn. Pat. Appln. KOKAI Publication No. 7-104901). If such POS terminals adapted to the multi-stage barcode system are used, without being modified, in merchandise management using radio tags, the information items represented by each multi-stage barcode may be stored in two or more radio tags, respectively. As described above, a radio-tag reader/writer can read all the data items stored in the radio tags attached to the items of merchandise in one go. Therefore, the efficiency of reading information will not decrease if a plurality of radio tags are attached to each item of merchandise.

A conventional POS terminal of this type, however, determines that a multi-stage barcode is a wrong one unless its constituent barcodes are input continuously. Assume that the first-stage and second-stage barcodes constituting the multi-stage barcode attached to merchandise A represent data items A1 and A2, respectively, and that the first-stage and second-stage barcodes constituting the multi-stage barcode attached to a merchandise B represent barcode data items B1 and B2, respectively. If barcode data items A1, A2, B1 and B2 are input to the POS terminal in the order they are mentioned, the POS terminal can process the sales information about these two merchandise items A and B. If barcode data item B1 is input after barcode data item A1, or barcode data item A2 is input after barcode data item B1, however, the POS terminal will determine that wrong data has been input.

Thus, in the system where a plurality of radio tags, each storing one barcode, are attached to each item of merchandise, the data items stored in the radio tags attached to merchandise items, respectively, are quickly read in a random order, then input to the POS terminal in the order they were read. Consequently, the POS terminal will probably determine that wrong data has been input.

BRIEF SUMMARY OF THE INVENTION

An object of the present invention is to accomplish merchandise management using radio tags, utilizing the functions of the conventional POS terminals that are adapted to the multi-stage barcode system.

According to an aspect of the present invention, there is provided a radio-tag reading apparatus in which a reading unit reads radio-tag data from a radio tag attached to an item of merchandise, the radio-tag data storing merchandise management data about the item of merchandise, and a tag-data storing unit stores the radio-tag data read by the reading unit. The apparatus comprises: analyzing means for determining whether a prescribed one of the bytes constituting the radio-tag data stored in the tag-data storing unit is identification data that specifies the merchandise management data; extracting means for extracting, from the radio-tag data stored in the tag-data storing unit, a prescribed number of bytes following the prescribed one of the bytes, when the prescribed one of the bytes is determined to be the identification data by the analyzing means; and output means for outputting the bytes extracted by the extracting means, as the merchandise management data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A best mode of practicing the invention or embodiments thereof will now be described with reference to the accompanying drawings.

The embodiments are merchandise sales registering systems, in which radio tags are attached, in place of multi-stage barcodes, to items of merchandise such as articles of clothing. The systems use a POS terminal that has the existing functions and performs merchandise management on the basis of data contained in multi-stage barcodes, without modifying the POS terminal.

First Embodiment

Figure 1:
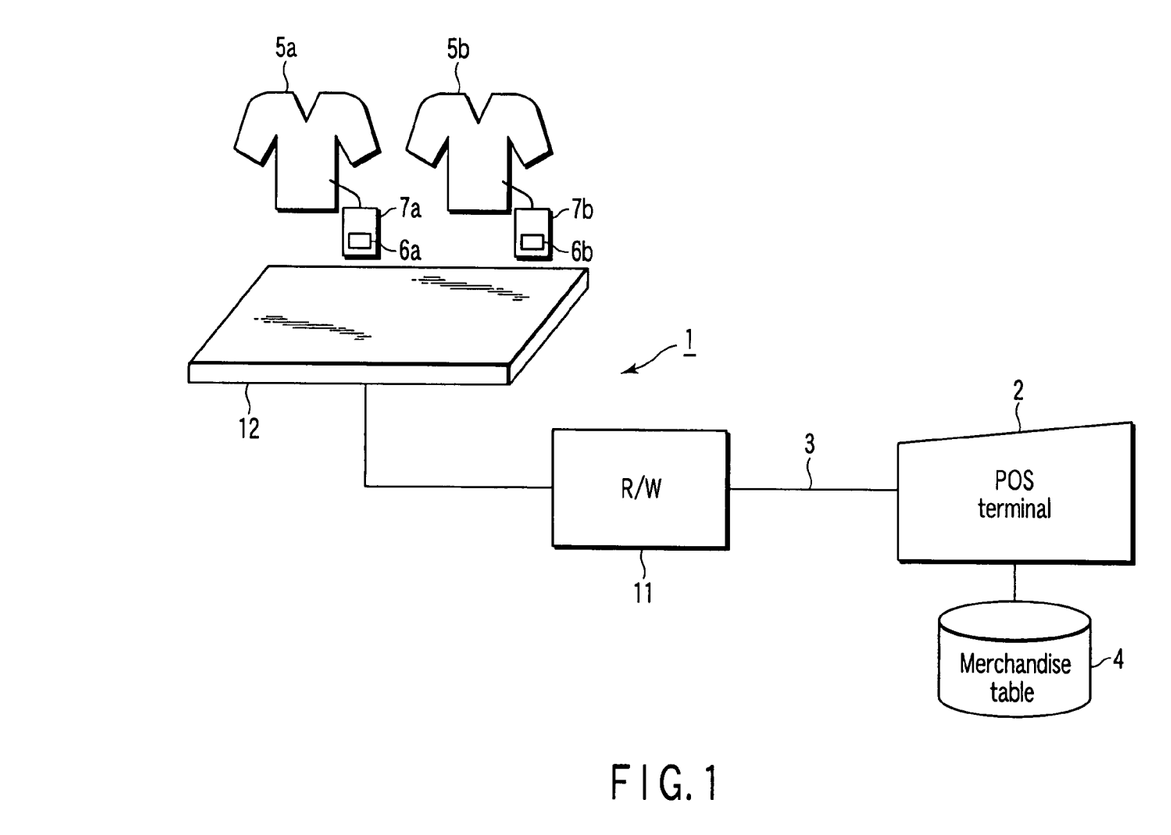
FIG. 1 is a diagram showing the configuration of a merchandise sales registering system according to a first embodiment of the present embodiment.

FIG. 1 is a diagram showing the configuration of a merchandise sales registering system. This system comprises a radio-tag reading apparatus 1 and a POS terminal 2. The radio-tag reading apparatus 1 is composed of a reader/writer 11 and an antenna unit 12 shaped like a flat plate. A telecommunication cable 3 connects the reader/writer 11 to the POS terminal 2. Bi-directional communication can therefore achieved between the reader/writer 11 and the POS terminal 2.

The POS terminal 2 has a merchandise table 4. The merchandise table 4 stores the data items such as the names of merchandise items and the prices thereof, in association with the codes allocated to the merchandise items, respectively. Upon receiving a merchandise code, the POS terminal 2 searches the merchandise table 4 for the data items about the merchandise item identified by the merchandise code, and reads the data items. Based on the data items thus read, the POS terminal 2 registers the sales data about the merchandise item.

The merchandise code is a barcode that contains 13-digit information in most cases. The barcode is so standardized that the highest two digits define a country code, the next five digits define a maker code, the following five digits define an item code, and the last digit is a check digit.

Some items of merchandise, such as articles 5a and 5b of clothing, differ in attributes such as size and color, although they have the same merchandise code. To distinguish these items of merchandise, merchandise-attribute codes, each representing the attributes of one item, are attached to the items of merchandise in the shop. Each merchandise-attribute code is a barcode consisting of 13 digits, just like the merchandise code. Sometimes, one merchandise-attribute code may be attached to each item of merchandise. In other cases, two or more merchandise-attribute codes may be attached to one item.

In the shop, not only is a barcode used as a merchandise code, but also a barcode indicating the attributes of merchandise is attached to each item of merchandise, thus forming a multi-stage barcode on the item of merchandise. On the basis of the information read from the multi-stage barcode, the POS terminal 2 performs the management of merchandise. This function of the POS terminal 2 is known in the art and will not be described herein.

The antenna unit 12 has two functions. One function is to radiate high-frequency signals as radio waves. The other function is to convert the radio waves it has received to high-frequency signals. When a radio tag 6 receives a radio wave radiated from the antenna unit 12, the radio tag is activated. The reader/writer 11 accesses, by radio, the memory incorporated in the radio tag 6 thus activated. Thus, the reader/writer 11 writes information to, or reads information from, the memory, without contacting the radio tag 6. The reader/writer 11 will be described later in more detail.

In the first embodiment, radio tags 6a and 6b, each being a multi-stage barcode, are attached to clothing articles 5a and 5b whose sales information needs to be managed. More precisely, the radio tags 6a and 6b are affixed to the price tags 7a and 7b that in turn are attached to the clothing articles 5a and 5b, respectively.

Figure 2:
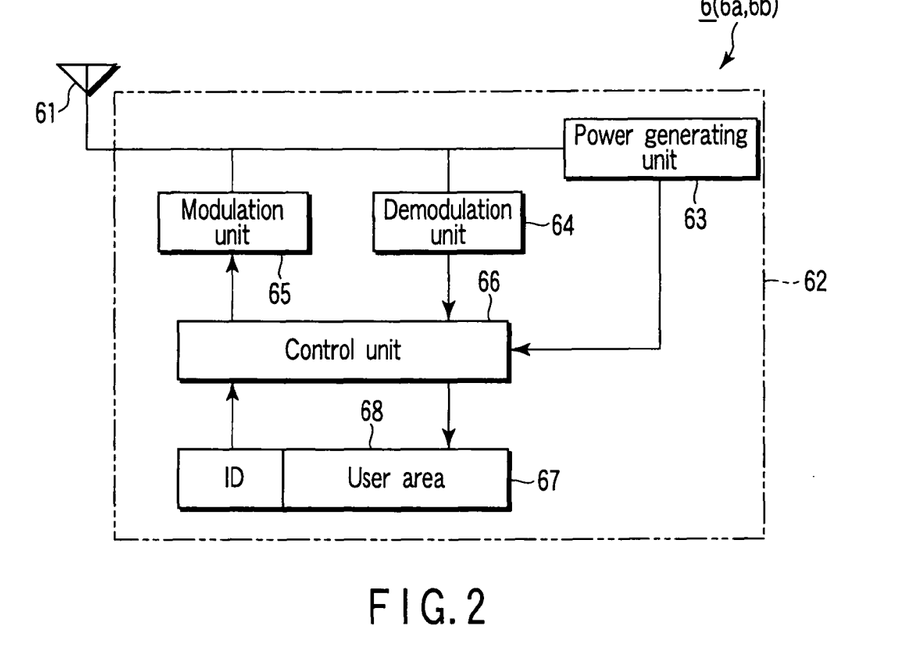
FIG. 2 is a block diagram showing the major components of a radio tag according to the first embodiment.

The radio tags (6a, 6b) are also known as radio frequency identification (RFID) tags, electronic tags, or the like. The major components of a radio tag are shown in the block diagram of FIG. 2. As FIG. 2 shows, each radio tag 6 is composed of an antenna 61 and an IC chip 62. The antenna 61 is a loop antenna shaped like, for example, a rectangle.

The IC chip 62 comprises a power generating unit 63, a demodulation unit 64, a modulation unit 65, a control unit 66, and a memory 67.

The antenna 61 receives a modulated wave from the radio-tag reading apparatus 1. In the IC chip 62, the power generating unit 63 rectifies and stabilizes the modulated wave supplied, generating power. The power is supplied to the other components of the IC chip 62. The demodulation unit 64 demodulates the wave, generating demodulated data. The demodulated data is supplied to the control unit 66. The modulation unit 65 receives the data output from the control unit 66 and modulates the same. The modulated data is sent to the antenna 61. The control unit 66 can receive the demodulated data generated by the demodulation unit 64 and write this data in the memory 67. The control unit 66 also can read the data from the memory 67 and supply the same to the modulation unit 65.

The memory 67 is a programmable nonvolatile memory such as an EEPROM. The memory 67 stores an ID code allocated to the radio tag 6 during the manufacture thereof by the manufacturer of the radio tag. The memory 67 has a user area 68 in which any data can be written by the user.

Figure 3:
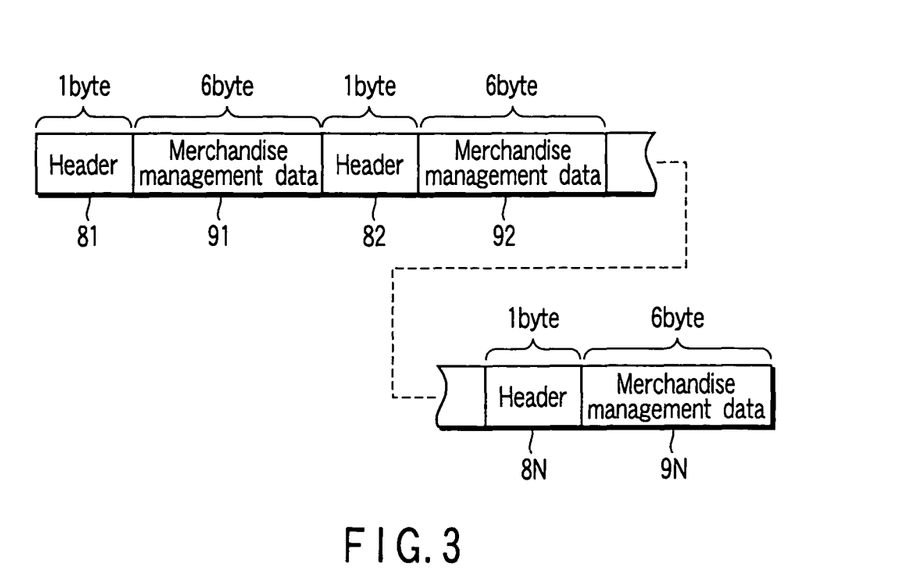
FIG. 3 is a schematic diagram depicting the data stored in the user area of the radio tag attached to an article of clothing, according to the first embodiment.

FIG. 3 depicts the data stored in the user area 68 of the radio tag 6 (6a or 6b) attached to the closing article 5 (5a or 5b). As shown in FIG. 3, one-byte header data items 81, 82, . . . 8N and six-byte merchandise management data items 91, 92, . . . 9N are alternately recorded in the user area 68 of the radio tag 6.

The header data items 81, 82, . . . 8N are each a one-byte data item specifying the type of data stored adjacent. In the first embodiment, each header data item is hexadecimal "30h" if the data item specifies merchandise management data. Thus, the header data "30h" works as identification data that identifies merchandise management data.

The merchandise management data items 91, 92, . . . 9N are binary values, each consisting of six bytes representing a 13-digit integer. The 13-digit integer corresponds to the first to Nth stages of the multi-stage barcode attached to one clothing article (where N≧2).

The reader/writer 11 performs the so-called anti-collision method to control the communication with the radio tag 6. Due to use of the anti-collision method, the reader/writer 11 can read data from a plurality of radio tags at the same time even if the radio tags sparsely exist in the communications region of the reader/writer 11.

Figure 4:
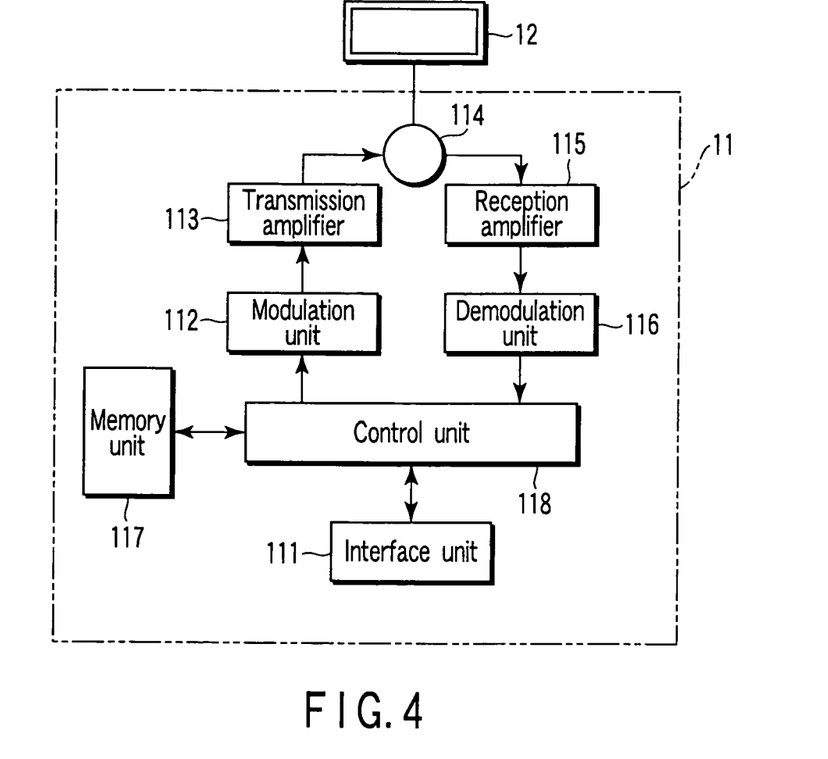
FIG. 4 is a block diagram showing the major components of the RFID reader/writer incorporated in the first embodiment.

FIG. 4 is a block diagram that shows the configuration of the reader/writer 11. As FIG. 4 shows, the reader/writer 11 comprises an interface unit 111, a modulation unit 112, a transmission amplifier 113, a circulator 114, a reception amplifier 115, a demodulation unit 116, a memory unit 117, and a control unit 118. The control unit 118 controls the other components of the reader/writer 11.

The interface unit 111 can relay data from the POS terminal 2 to the control unit 118 and vice versa, via the telecommunication cable 3. The modulation unit 112 receives transmission data supplied from the control unit 118 and modulates this data to a high-frequency signal, which is output to the transmission amplifier 113. The transmission amplifier 113 amplifies the high-frequency signal and outputs the same to the circulator 114. The circulator 114 outputs the modulated signal amplified in the transmission amplifier 113, to the antenna unit 12. The circulator 114 also receives the high-frequency signal from the antenna unit 12 and outputs the same to the reception amplifier 115. The reception amplifier 115 amplifies the high-frequency signal input from the circulator 114 and amplifies the same. The signal thus amplified is output to the demodulation unit 116. The demodulation unit 116 demodulates the high-frequency signal amplified by the reception amplifier 115 and converts the same to reception data. The reception data is output to the control unit 118. The control unit 118 reads the radio-tag data from the reception data demodulated by the demodulation unit 116.

Figure 5:
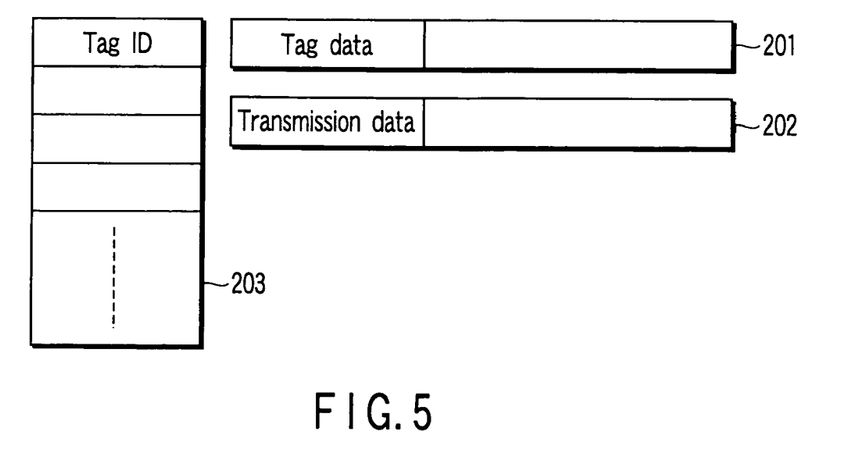
FIG. 5 is a schematic diagram depicting the major storage areas of the memory provided in the RFID reader/writer incorporated in the first embodiment.

As shown in FIG. 5, the memory unit 117 has a tag-data buffer 201, a transmission buffer 202, and a tag-ID memory 203.

The tag-data buffer 201 temporarily stores the latest radio-tag data the reader/writer 11 has read. The transmission buffer 202 temporarily stores the data that is to be transmitted to the POS terminal 2. The tag-ID memory 203 cumulates the IC codes of the radio tags from which the reader/writer 11 has read data.

Figure 6:
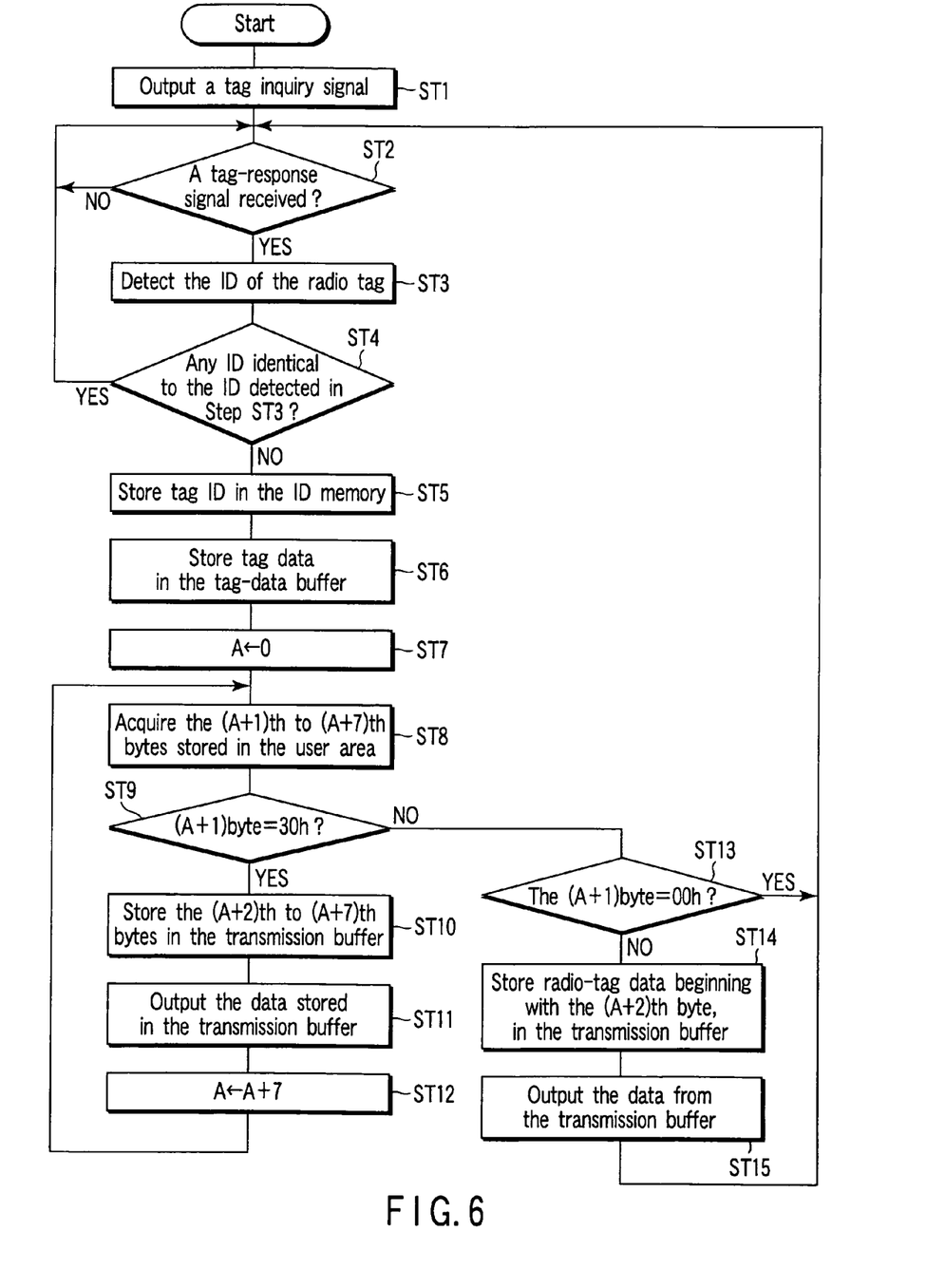
FIG. 6 is a flowchart explaining the major steps that the control unit of the RFID reader/writer performs in the first embodiment.

The control unit 118 is configured to read data from the radio tag 6 as shown in the flowchart of FIG. 6 when it receives an activation command from the POS terminal 2.

First, the control unit 118 outputs a tag inquiry signal to the modulation unit 112 in Step ST1. Then, the antenna unit 12 transmits a tag inquiry radio wave.

Next, in Step ST2, the control unit 118 determines whether the antenna unit 12 has received a tag-response signal from the radio tag 6. If the control unit 118 receives a tag-response signal from the antenna unit 12, it analyzes the response signal and detects the ID of the radio tag in Step ST3.

The control unit 118 then searches the tag-ID memory 203 in Step ST4, determining whether the tag-ID memory 203 stores an ID identical to the ID detected from the response signal. If the tag-ID memory 203 stores an ID identical to the ID detected from the response signal, the control unit 118 waits for the next response signal.

If the tag ID detected from the response signal is not stored in the tag-ID memory 203, the control unit 118 writes the tag ID in the ID memory 203 in Step ST5. Next, in Step ST6, the control unit 118 communicates with the radio tag whose ID has just been written in the ID memory 203 and reads the radio-tag data stored in the user area 68 of the radio tag. The control unit 118 overwrites the data thus read in the tag-data buffer 201. The reception amplifier 115, demodulation unit 116 and control unit 118 constitute a reading unit in the reader/writer 11.

Next, the control unit 118 resets the count A of a byte counter to "0" in Step ST7. In Step ST8, the control unit 118 acquires seven-byte data from the tag-data buffer 201, the data consisting of the (A+1)th to (A+7)th bytes of the radio-tag data. Note that "A" is the count A of the byte counter.

In Step ST9, the control unit 118 determines whether the (A+1)th byte of the seven-byte data acquired in Step ST8 is the identification data [30h] specifying the merchandise management data (by using analyzing means). If the (A+1)th byte is not the identification data [30h], the control unit 118 goes to Step ST13, which will be described later.

If the (A+1)th byte is the identification data [30h], the control unit 118 goes to Step ST10. In Step ST10, six-byte data consisting of the (A+2)th to (A+7)th bytes is extracted from the seven-byte data acquired from the tag-data buffer 201 (by extracting means). The six-byte data thus extracted is overwritten, as merchandise management data, in the transmission buffer 202. In Step ST11, the control unit 118 (output means) outputs the six-byte data stored in the transmission buffer 202, to the POS terminal 2 through the interface unit 111.

In Step ST12, the control unit 118 then increases the count A of the byte counter by "7." Thereafter, the operation returns to Step ST8, the control unit 118 acquires, from the tag-data buffer 201, seven-byte data, or the (A+1)th to (A+7)th bytes of the radio-tag data stored in the tag-data buffer 201. In Step ST9, the control unit 118 determines whether the (A+1)th byte of the seven-byte data is the identification data [30h] specifying the merchandise management data. If the (A+1)th byte is the identification data [30h], the control unit 118 performs the process of Steps ST10 to ST12. The operation returns to Step ST8 again.

In Step S9, the (A+1)th byte may not be the identification data [30h]. If this is the case, the control unit 118 performs Step ST13. In Step S13, the control unit 118 determines whether the (A+1)th byte is zero data [00h] that indicates no data. If the (A+1)th byte is zero data [00h], the operation returns to Step ST2. In Step ST2, the control unit 118 waits for the next response signal.

The (A+1)th byte may be neither the identification data [30h] nor the zero data [00h]. In this case, the control unit 118 goes to Step ST14 and acquires all radio-tag data beginning with the (A+2)th byte, from the tag-data buffer 201. The data thus acquired is overwritten in the transmission buffer 202. The control unit 118 outputs the data stored in the transmission buffer 202, to the POS terminal 2 through the interface unit 111.

After acquiring all radio-tag data in Step ST14, the control unit 118 returns to Step ST2 and waits for the next response signal.

Assume that two clothing articles, 5a and 5b, are placed on the antenna unit 12 as shown in FIG. 1. The articles 5a and 5b are items of merchandise, which are managed by using two-stage barcodes, each composed of an identical merchandise code and a different merchandise-attribute code.

Figure 7:
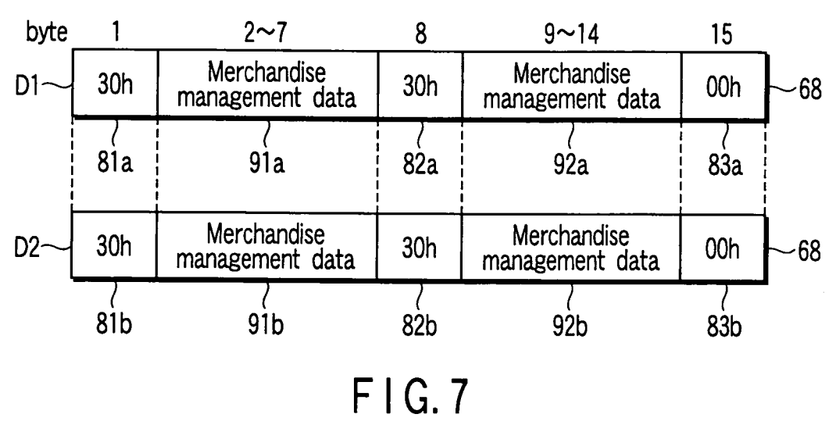
FIG. 7 is a diagram showing an example of the data stored in the user area of a radio tag attached to an article of clothing, in the first embodiment.

In the radio tag 6a affixed to the price tag 7a that in turn is attached to the clothing article 5a, data D1 of the format shown in FIG. 7 is stored in the user area 68 of the memory 67 provided in the radio tag 6a. More precisely, as shown in FIG. 7, the first byte stored is header data [30h] 81a, the second to seventh bytes are merchandise management data 91a, the eighth byte is header data [30h] 82a, the ninth to fourteenth bytes are merchandise management data 92a, and the fifteenth byte, i.e., last byte, is zero data [00h] 82a.

The merchandise management data 91a is a six-byte binary value representing the 13-digit merchandise code of the clothing article 5a. The merchandise management data 91a corresponds to the first-stage data of the multi-stage barcode attached to the clothing article 5a. The merchandise management data 92a is a binary value representing a 13-digit integer that corresponds to the merchandise-attribute code of the clothing article 5a. This merchandise management data 92a corresponds to the second-stage data of the multi-stage barcode attached to the clothing article 5a.

Similarly, in the radio tag 6b affixed to the price tag 7b that in turn is attached to the clothing article 5b, data D2 of the format shown in FIG. 7 is stored in the user area 68 of the memory 67 provided in the radio tag 6b. That is, the first byte stored is header data [30h] 81b, the second to seventh bytes are merchandise management data 91b, the eighth byte is header data [30h] 82b, the ninth to fourteenth bytes are merchandise management data 92b, and the fifteenth byte, i.e., last byte, is zero data [00h] 83b.

The merchandise management data 91b is a six-byte binary value representing the 13-digit merchandise code of the clothing article 5b. The merchandise management data 91b corresponds to the first-stage data of the multi-stage barcode attached to the clothing article 5b. The merchandise management data 92b is a binary value representing a 13-digit integer that corresponds to the merchandise-attribute code of the clothing article 5b. This merchandise management data 92b corresponds to the second-stage data of the multi-stage barcode attached to the clothing article 5b.

In this state, the POS terminal 2 may output an activation command to the reader/writer 11. Then, the antenna unit 12 transmits an inquiry radio wave. Assume that the radio tag 6a attached to the clothing article 5a first receives the inquiry wave and is thereby activated, and that the radio tag 6b attached to the clothing article 5b then receives the inquiry wave and is thereby activated.

In this case, the radio-tag data received at the antenna unit 12 is stored in the tag-data buffer 201 of the reader/writer 11. This data is radio-tag data D1 stored in the user area 68 of the radio tag 6a attached to the clothing article 5a.

After radio-tag data D1 has been stored in the tag-data buffer 201, the reader/writer 11 checks the first byte of radio-tag data D1. Since the first byte of radio-tag data D1 is header data [30h] 81a, the reader/writer 11 extracts the second to seventh bytes from the tag-data buffer 201. The bytes extracted are transmitted to the POS terminal 2. The data constituted by these bytes is the merchandise management data 91a that corresponds to the merchandise code of the clothing article 5a.

The reader/writer 11 then checks the eighth byte of radio-tag data D1. Since the eighth byte is header data [30h] 82a, the reader/writer 11 extracts the ninth to fourteenth bytes from the tag-data buffer 201. The bytes extracted are transmitted to the POS terminal 2. The data constituted these bytes is the merchandise management data 92a that corresponds to the merchandise-attribute code of the clothing article 5a.

Next, the reader/writer 11 checks the fifteenth byte of radio-tag data D1. Since the fifteenth byte is zero data [00h] 83a, the reader/writer 11 stops processing radio-tag data D1 stored in the tag-data buffer 201.

In the reader/writer 11, other radio-tag data is stored in the tag-data buffer 201 of the reader/writer 11. This data is radio-tag data D2 stored in the user area 68 of the radio tag 6b attached to the clothing article 5b.

After radio-tag data D2 has been stored in the tag-data buffer 201, the reader/writer 11 checks the first byte of radio-tag data D2. Since the first byte of radio-tag data D2 is header data [30h] 81b, the reader/writer 11 extracts the second to seventh bytes from the tag-data buffer 201. The bytes extracted are transmitted to the POS terminal 2. The data constituted these bytes is the merchandise management data 91b that corresponds to the merchandise code of the clothing article 5b.

The reader/writer 11 then checks the eighth byte of radio-tag data D2. Since the eighth byte is header data [30h] 82b, the reader/writer 11 extracts the ninth to fourteenth bytes from the tag-data buffer 201. The bytes extracted are transmitted to the POS terminal 2. The data constituted these bytes is the merchandise management data 92b that corresponds to the merchandise-attribute code of the clothing article 5b.

Then, the reader/writer 11 checks the fifteenth byte of radio-tag data D2. Since the fifteenth byte is zero data [00h] 83b, the reader/writer 11 stops processing radio-tag data D2 stored in the tag-data buffer 201.

When the reader/writer 11 finishes operating as described above, the merchandize code and merchandise-attribute code of the clothing article 5a are input to the POS terminal 2, in the order they are mentioned. The sales data of the clothing article 5a is therefore registered reliably. Then, the merchandize code and merchandise-attribute code of the clothing article 5b are input to the POS terminal 2, in the order they are mentioned. Therefore, the sales data of the clothing article 5b is reliably registered, too.

It does not matter if the radio tag 6b attached to the clothing article 5b is first activated and the radio tag 6a attached to the clothing article 5a is then activated. In this case, the merchandise code and merchandise-attribute code of the clothing article 5b are input to the POS terminal 11, in the order they are mentioned. Then, the merchandise code and merchandise-attribute code of the clothing article 5a are input to the POS terminal 11, in the order they are mentioned. In this case, too, the sales data of the clothing article 5a and that of the clothing article 5b can be reliably registered.

As described above, the first embodiment can perform the merchandise management, by using radio tags, not utilizing multi-stage barcodes as has been hitherto practiced. The use of the radio tags simplifies the process of reading data in registering merchandise items. This can greatly shorten the time for registering the merchandise items.

In addition, the POS terminal 2 adapted to the multi-stage barcodes system can be used in any shop, without being modified. That is, the program installed in any POS terminal used need not be replaced by a new program. Nor is it necessary to replace the POS terminal by a new POS terminal in the shop. Hence, no installation cost is required.

In the first embodiment, each radio tag can store the data one multi-stage barcode represents. Hence, less radio tags can store the same amount of information than in the case where each radio tag stores the data of one stage of a multi-stage barcode. This helps to reduce the cost of the merchandise management.

In the first embodiment, the first seven bytes of the radio-tag data stored in the tag-data buffer 201 are read first. The first of these seven bytes is analyzed, determining whether it is data [30h] that identifies the merchandise management data. If the first byte is determined to be identification data [30h], the remaining six bytes are extracted and output as merchandise management data to an external apparatus. Thereafter, the next seven bytes of the radio-tag data are read, and the first of these bytes is analyzed in the same way as described above.

In this method, after the merchandise data has been output, the following seven bytes are read from the tag-data buffer 201. It is then determined whether the first of these bytes is zero data [00h]. If this byte is zero data [00h], the following six bytes read will be wasted. A second embodiment of the present invention, which does not waste any bytes read, will be described below.

Second Embodiment

The second embodiment differs from the first embodiment in a part of the process the reader/writer 11 performs. In any other respect, the second embodiment is the same as the first embodiment. Therefore, the components identical to those of the first embodiment are designated by the same reference numbers and will not be described in detail.

Figure 8:
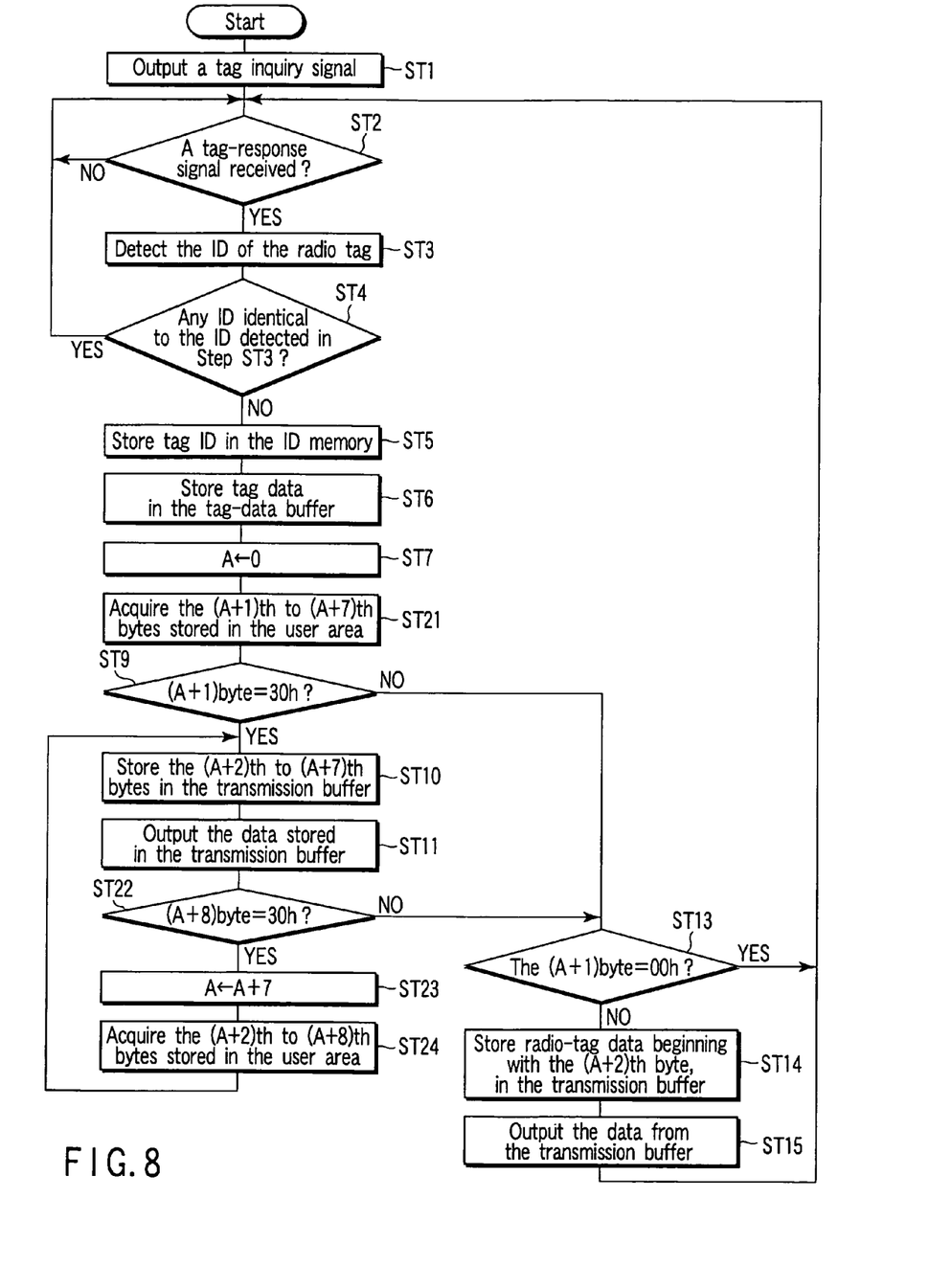
FIG. 8 is a flowchart explaining the major steps that the control unit of the RFID reader/writer performs in a second embodiment of the present invention.

FIG. 8 is a flowchart explaining the major steps that the control unit 118 of the second embodiment. As seen from FIG. 8, Steps ST1 to ST7 are identical to those shown in FIG. 6 (first embodiment). In the first embodiment, seven-byte data consisting of the (A+1)th to (A+7)th bytes of the radio-tag data is read from the tag-data buffer 201 in Step ST8. In the second embodiment, the control unit 118 acquires, in Step ST21, eight-byte data consisting of the (A+1)th to (A+8)th bytes of the radio-tag data from the tag-data buffer 201.

After acquiring the eight-byte data, the control unit 118 determines in Step ST9 whether the (A+1)th byte of the eight-byte data is the identification data [30h] specifying the merchandise management data, as in the first embodiment. If the (A+1)th byte is not identification data [30h], the control unit 118 goes to Step ST13.

If the (A+1)th byte is the identification data [30h], the control unit 118 goes to Step ST10. In Step ST10, six-byte data consisting of the (A+2)th to (A+7)th bytes is extracted from the eight-byte data acquired from the tag-data buffer 201. The six-byte data thus extracted is overwritten, as merchandise management data, in the transmission buffer 202. In Step ST11, the control unit 118 outputs the six-byte data stored in the transmission buffer 202, to the POS terminal 2 through the interface unit 111.

Next, the control unit 118 determines in Step ST22 whether the (A+8)th byte of the eight bytes acquired from the tag-data buffer 201 is identification data [30h]. If the A+8)th byte is not identification data [30h], the control unit 118 goes to Step ST13.

If the (A+8)th byte is identification data [30h], the control unit 118 increases the count of the byte counter by "7" in Step ST23. In Step ST24, the control unit 118 acquires the (A+2)th to (A+8)th bytes of the radio-tag data stored in the tag-data buffer 210. The operation then returns to Step ST10. The control unit 118 performs the process of Steps ST10, ST11 and ST12 again.

The second embodiment, in which the radio-tag data is read in the sequence described above, can achieve the same advantage as the first embodiment.

Moreover, the first eight bytes of the radio-tag data stored in the tag-data buffer 201 are read first, and the first of these eight bytes is analyzed, determining whether the first byte is identification data [30h] that specifies the merchandise management data. If the first byte is identification data [30h], the following six bytes are extracted and output as merchandise management data to an external apparatus. Thereafter, the control unit 118 analyzes the remaining one byte.

Hence, if the remaining one byte is zero data [00h], no further data will be read. Therefore, bytes read are not wasted, unlike in the first embodiment.

In embodiments described above, the merchandise management data consists of six bytes. Nonetheless, the number of bytes constituting this merchandise management data is not limited to six. The merchandise management data may consist of, for example, seven bytes.

If the data consists of seven bytes, the embodiments are modified as follows. In the first embodiment, the process the control unit 118 performs as shown in FIG. 6 is changed. First, eight bytes, i.e., the (A+1)th to (A+8)th bytes, of the radio-tag data stored in the tag-data buffer 201 are acquired in Step ST8. Second, the count A of the byte counter is increased by "8" in Step ST12.

In the second embodiment, the process the control unit 118 performs as shown in FIG. 8 is changed. First, nine bytes, i.e., the (A+1)th to (A+0)th bytes, are acquired in Step ST21. Second, eight bytes, i.e., the (A+2)th to (A+9)th bytes, are acquired in Step ST24. Third, the count A of the byte counter is increased by "8" in Step ST23.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio-tag reading apparatus comprising:
a reading unit which reads radio-tag data in which header data and merchandise management data of a prescribed number of bytes are alternately recorded from a radio tag attached to an item of merchandise;
a tag-data storing unit which stores the radio-tag data read by the reading unit;
first data reading means for reading first header data and data of a prescribed number of bytes which is recorded following the first header data from the radio-tag data recorded in the tag-data storing unit;

first data analyzing means for determining whether the first header data read by the first data reading means is identification data that specifies the merchandise management data;

first data output means for outputting, when the first header data is determined as the identification data by the first data analyzing means, the data of the prescribed number of bytes which is read following the first header data by the first data reading means, as the merchandise management data to a POS terminal;

second data reading means for reading second header data, which is recorded in the tag-data storing unit following data of the prescribed number of bytes output by the first data output means, and data of a prescribed number of bytes which is recorded following the second header data;

second data analyzing means for determining whether the second header data read by the second data reading means is identification data that specifies the merchandise management data or data that indicates no data;

second data output means for outputting, when the second header data is determined as the identification data by the second data analyzing means, the data of the prescribed number of bytes which is read following the second header data by the second data reading means to the POS terminal; and stopping means for stopping output of the radio-tag data recorded in the tag data storing unit to the POS terminal when the second header data is determined as the data that indicates no data by the second data analyzing means.

2. The apparatus according to claim 1, further comprising third data output means for outputting all data following the second header data to the POS terminal when the second data analyzing means determines that the second header data is neither the merchandise management data nor the data that indicates no data.

3. The apparatus according to claim 1, wherein:
the first data reading means reads the first header data, the data of the prescribed number of bytes which is recorded following the first header data, and the second header data which is recorded following the data of the prescribed number of bytes from the radio-tag data recorded in the tag-data storing unit;

the second data analyzing means determines whether the second header data read by the first data reading means is identification data that specifies the merchandise management data or data that indicates no data; and the second data reading means reads the data of the prescribed number of bytes which is recorded following the second header data when the second header data is determined as the identification data that specifies the merchandise management data by the second data analyzing means.

4. A radio tag to be attached to an item of merchandise whose information of which is managed by using a multi-stage barcode, the radio tag comprising:
a memory which is configured to store an ID code allocated to the radio tag and management data about the item of merchandise; and a control unit which is configured to control a process of writing data in, and reading data from, the memory;

wherein the memory stores an identification data item specifying the management data about the item of merchandise and data corresponding to the first-stage barcode of the multi-stage barcode, and adjacently stores in an alternating fashion, additional identification data items specifying management data about other items of merchandise and data items corresponding to the second-stage et seq. of the multi-stage barcode.

5. The radio tag of claim 4, wherein the identification data item and the merchandise management data corresponding to the first stage of the multi-stage barcode are stored directly adjacent each other, and each of said additional identification data items and corresponding management data about other items of merchandise are stored adjacent to each other in an alternating fashion with a first of said additional identification data items stored directly adjacent the management data corresponding to the first stage of the multistage barcode.

* * * * *